US012715096B1

(12) United States Patent
Yeh et al.

(10) Patent No.: US 12,715,096 B1
(45) Date of Patent: Aug. 25, 2026

(54) FORCE-ADJUSTABLE STAPLE GUN

(71) Applicant: PAO SHEN ENTERPRISES CO., LTD., Chang Hua (TW)

(72) Inventors: Sheng-Lung Yeh, Chang Hua (TW); Chun-Man Lai, Chang Hua (TW)

(73) Assignee: PAO SHEN ENTERPRISES CO., LTD., Chang Hua (TW)

( * ) Notice: Subject to any disclaimer, the term of this patent is extended or adjusted under 35 U.S.C. 154(b) by 0 days.

(21) Appl. No.: 19/268,061

(22) Filed: Jul. 14, 2025

(30) Foreign Application Priority Data

May 5, 2025 (TW) ................................ 114116827

(51) Int. Cl.
*B25C 5/11* (2006.01)

(52) U.S. Cl.
CPC ...................................... *B25C 5/11* (2013.01)

(58) Field of Classification Search
CPC .................................... B25C 5/06; B25C 5/11
See application file for complete search history.

(56) References Cited

U.S. PATENT DOCUMENTS 1,990,725 A * 2/1935 Crofoot ..................... B25C 5/10 173/124
2,719,296 A * 10/1955 Marano ..................... B25C 5/06 227/128
6,367,676 B1 * 4/2002 Opland ................. B25C 5/1696 227/123
10,946,505 B2 * 3/2021 Yeh ......................... F16F 1/123
11,090,792 B2 * 8/2021 Wang ........................ B25C 5/11
11,305,410 B2 * 4/2022 Yeh ........................... B25C 5/11
11,780,068 B2 * 10/2023 Yeh ........................... B25C 5/11 227/146
2002/0108996 A1 * 8/2002 Cornett ..................... B25C 5/00 227/132
2011/0297725 A1 * 12/2011 Huang ...................... B25C 5/11 227/140
2014/0231486 A1 * 8/2014 Burch ................... B25C 5/0285 227/63

FOREIGN PATENT DOCUMENTS

FR 2477458 A1 * 9/1981 ............... B25C 5/10
TW 545350 8/2003

* cited by examiner

*Primary Examiner* — Shelley M Self
*Assistant Examiner* — David G Shutty
(74) *Attorney, Agent, or Firm* — Burris Law, PLLC

(57) ABSTRACT

A force-adjustable staple gun includes a case unit, a staple-strike piece, a handle unit, a force storage unit, a resilient unit, and a force adjustment unit. The force storage unit is operable to resiliently bias the staple-strike piece to move in a top-bottom direction. The resilient unit is operable to resiliently bias the handle unit. The force adjustment unit includes a driver axle extending through the annular portion, and an operation member operable to urge the driver axle to pivot relative to the case unit. The driver axle extends along a central line, and has a first support surface disposed around the central line, and a second support surface disposed around the central line. A first distance between the first support surface and the central line is greater than a second distance between the second support surface and the central line.

11 Claims, 9 Drawing Sheets

FORCE-ADJUSTABLE STAPLE GUN

CROSS-REFERENCE TO RELATED APPLICATION

This application claims priority to Taiwanese Invention Patent Application No. 114116827, filed on May 5, 2025, the entire disclosure of which is incorporated by reference herein.

FIELD

The disclosure relates to a staple gun, and more particularly to a force-adjustable staple gun.

BACKGROUND

A conventional staple gun disclosed in Taiwanese Utility Model U.S. Pat. No. 545,350 includes a casing having an abutment member and a support member, a handle unit having a hook piece, a spring, a striking member separably engaging the hook piece, a resilient piece abutting against the abutment member, a staple slot, and a retaining piece. When the handle unit is pressed, the striking member is urged thereby to drive the resilient piece to move upward; at the same time, by virtue of the abutment member, a front end of the resilient piece is bent and allowed to bias the striking member. When the handle unit is pressed to pivot downward to abut against the support member and thus slides rearward, the hook piece of the handle unit is disengaged from the striking member. At this time, the striking member is biased by the resilient piece and moves downward to strike out a staple from the staple slot, achieving the purpose of stapling.

Although the conventional staple gun can achieve the expected stapling purpose, the resilient force of the resilient piece and the striking force of the striking member cannot be adjusted. Thus, the conventional staple gun cannot meet different needs.

SUMMARY

Therefore, an object of the disclosure is to provide a force-adjustable staple gun that can alleviate at least one of the drawbacks of the prior art.

According to the disclosure, the force-adjustable staple gun includes a case unit, a staple-strike piece, a handle unit, a force storage unit, a resilient unit, and a force adjustment unit. The case unit has an accommodation space therein. The staple-strike piece is disposed in the accommodation space and is movable in a top-bottom direction. The handle unit is pivotably mounted to the case unit. The force storage unit is disposed in the accommodation space, is operable to resiliently bias the staple-strike piece to move in the top-bottom direction, and has an annular portion that defines an inner hole, a lever arm that is connected to one end of the annular portion, and a driver arm that is connected to another end of the annular portion. The lever arm is operable to be urged by the handle unit for the driver arm to resiliently move. The resilient unit is disposed in the accommodation space and is operable to resiliently bias the handle unit. The force adjustment unit is mounted to the case unit, and includes a driver axle that is pivotably mounted to the case unit and that extends through the inner hole, and an operation member that is operable to urge the driver axle to pivot relative to the case unit. The driver axle extends along a central line, and has a first support surface that is disposed around the central line, and a second support surface that is disposed around the central line and that is located on a side of the first support surface. A first distance between the first support surface and the central line is greater than a second distance between the second support surface and the central line.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
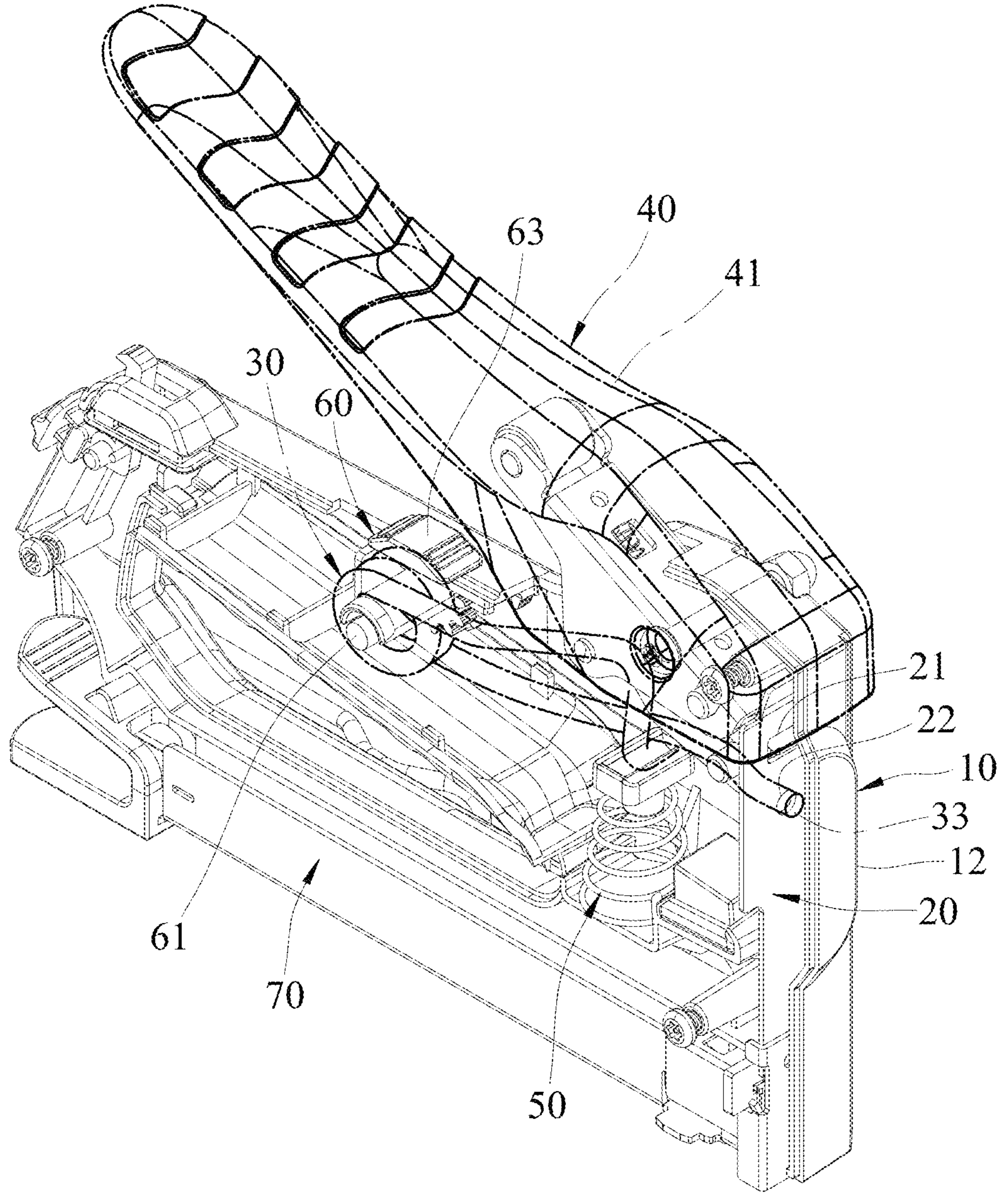
FIG. 1 is a fragmentary perspective view of a first embodiment of a force-adjustable staple gun according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
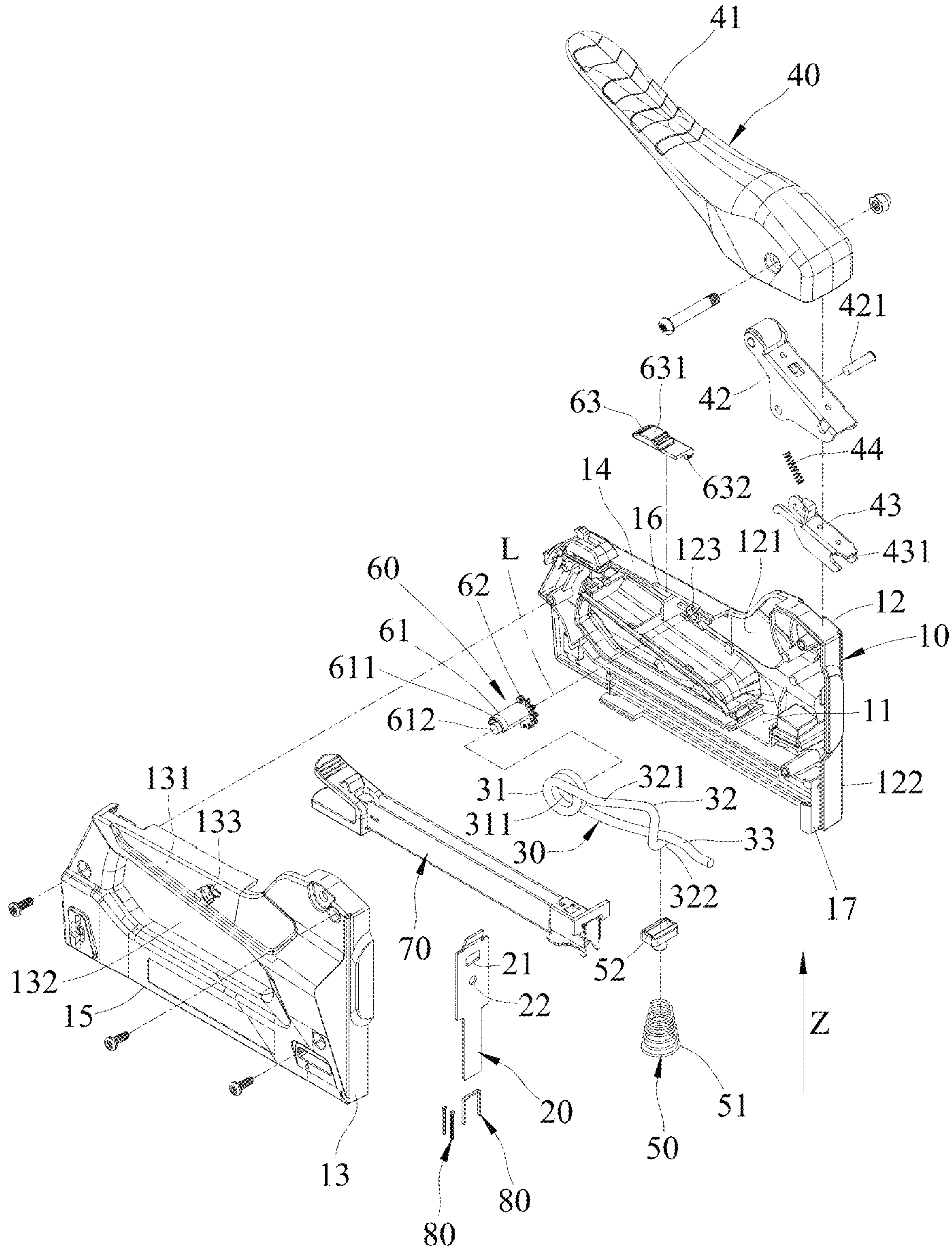
FIG. 2 is an exploded perspective view of the first embodiment.

Referring to FIGS. 1 and 2, a first embodiment of a force-adjustable staple gun according to the disclosure includes a case unit 10, a staple-strike piece 20, a force storage unit 30, a handle unit 40, a resilient unit 50, a force adjustment unit 60 and a staple storage unit 70.

The case unit 10 has a first case body 12 and a second case body 13 that cooperatively define an accommodation space 11 in the case unit 10 and that have a top portion 14 and a bottom portion 15 opposite to the top portion 14, a slide groove 16 that is formed in the top portion 14 and that spatially communicates with the accommodation space 11 and an external environment, and a staple outlet 17 that is formed in the bottom portion 15 and that spatially communicates with the accommodation space 11 and the external environment. The first case body 12 has a first inner surface 121 that is adjacent to the accommodation space 11, a first outer surface 122 that is opposite to the first inner surface 121, and an axle hole 123 that is recessed from the first inner surface 121 toward the first outer surface 122. The second case body 13 has a second inner surface 131 that is adjacent to the accommodation space 11, a second outer surface 132 that is opposite to the second inner surface 131, and a bearing hole 133 that is recessed from the second inner surface 131 toward the second outer surface 132.

The staple-strike piece 20 is disposed in the accommodation space 11, is movable in a top-bottom direction (Z), and corresponds in position to the staple outlet 17 in the top-bottom direction (Z). The staple-strike piece 20 has an engagement groove 21 and a connection groove 22 that is disposed under the engagement groove 21.

The force storage unit 30 is disposed in the accommodation space 11, is operable to resiliently bias the staple-strike piece 20 to move in the top-bottom direction (Z), and has an annular portion 31 that defines an inner hole 311, a lever arm 32 that is connected to one end of the annular portion 31, and a driver arm 33 that is connected to another end of the annular portion 31. In this embodiment, the force storage unit 30 is exemplified as a torsion spring, but is not limited thereto. The lever arm 32 is operable to be urged by the handle unit 40 for the driver arm 33 to resiliently move, details of which will be illustrated in the following. The lever arm 32 has a main segment 321 that is inverted-L shaped and a connection segment 322 that is perpendicularly connected to the main segment 321. The driver arm 33 is inserted into the connection groove 22 of the staple-strike piece 20.

The handle unit 40 is pivotably mounted to the case unit 10, and includes a handle member 41 that is pivotably connected to the case unit 10, a support frame 42 that is covered by and connected to the handle member 41 and that is pivotably connected to the case unit 10, an engagement member 43 that is pivotably connected to the case unit 10 and the support frame 42, and a spring member 44 that is connected between the support frame 42 and the engagement member 43. The support frame 42 includes an abutment portion 421 that is located at the bottom thereof, and that abuts against the main segment 321 of the force storage unit 30. The engagement member 43 has an engagement portion 431 that detachably engages the engagement groove 21 of the staple-strike piece 20.

The resilient unit 50 is disposed in the accommodation space 11 and is operable to resiliently bias the force storage unit 30 and the handle unit 40. The resilient unit 50 includes a resilient member 51 and an abutment seat 52 that abuts against the resilient member 51. In this embodiment, the resilient member 51 is a compression spring, but is not limited to such. The connection segment 322 of the lever arm 32 abuts against the abutment seat 52.

Referring to FIGS. 3, 5, 6A and 6B, the force adjustment unit 60 is mounted to the case unit 10, and includes a driver axle 61 that is pivotably mounted to the case unit 10 and that extends through the inner hole 311 of the force storage unit 30, a gear wheel 62 that is connected to the driver axle 61, and an operation member 63 that is operable to urge the driver axle 61 to pivot relative to the case unit 10 (specifically, that is operable to urge the driver axle 61 and the gear wheel 62 to pivot relative to the case unit 10) and that is slidably mounted to the case unit 10. The driver axle 61 has two ends that respectively and pivotably engage the axle hole 123 and the bearing hole 133. The driver axle 61 extends along a central line (L) (see FIG. 2), and has a first support surface 611 that is disposed around the central line (L), and a second support surface 612 that is disposed around the central line (L) and that is located on a side of the first support surface 611. In this embodiment, the first support surface 611 of the force adjustment unit 60 is semi-circular around the central line (L), and the second support surface 612 of the force adjustment unit 60 is semi-circular around the central line (L), but the disclosure is not limited to such. A first distance (r1) between the first support surface 611 and the central line (L) is greater than a second distance (r2) between the second support surface 612 and the central line (L). That is to say, a radius of the first support surface 611 is greater than a radius of the second support surface 612. The gear wheel 62 is adjacent to the first inner surface 121. In the first embodiment, the operation member 63 is slidably mounted to the slide groove 16 of the case unit 10, and has an operation portion 631 that protrudes and is located outside the case unit 10, and a gear rack 632 that is disposed in the accommodation space 11 of the case unit 10 and that meshes with the gear wheel 62.

The staple storage unit 70 is detachably mounted to the case unit 10, and stores multiple staples 80. The staple storage unit 70 is adapted for different types of staples 80 (see FIG. 2).

For a further understanding of the functions, technical means, and expected effects achieved by the combination of the components of the present disclosure, the following detailed description is provided, which can enable a deeper and more concrete understanding of the present disclosure.

Figure 3:
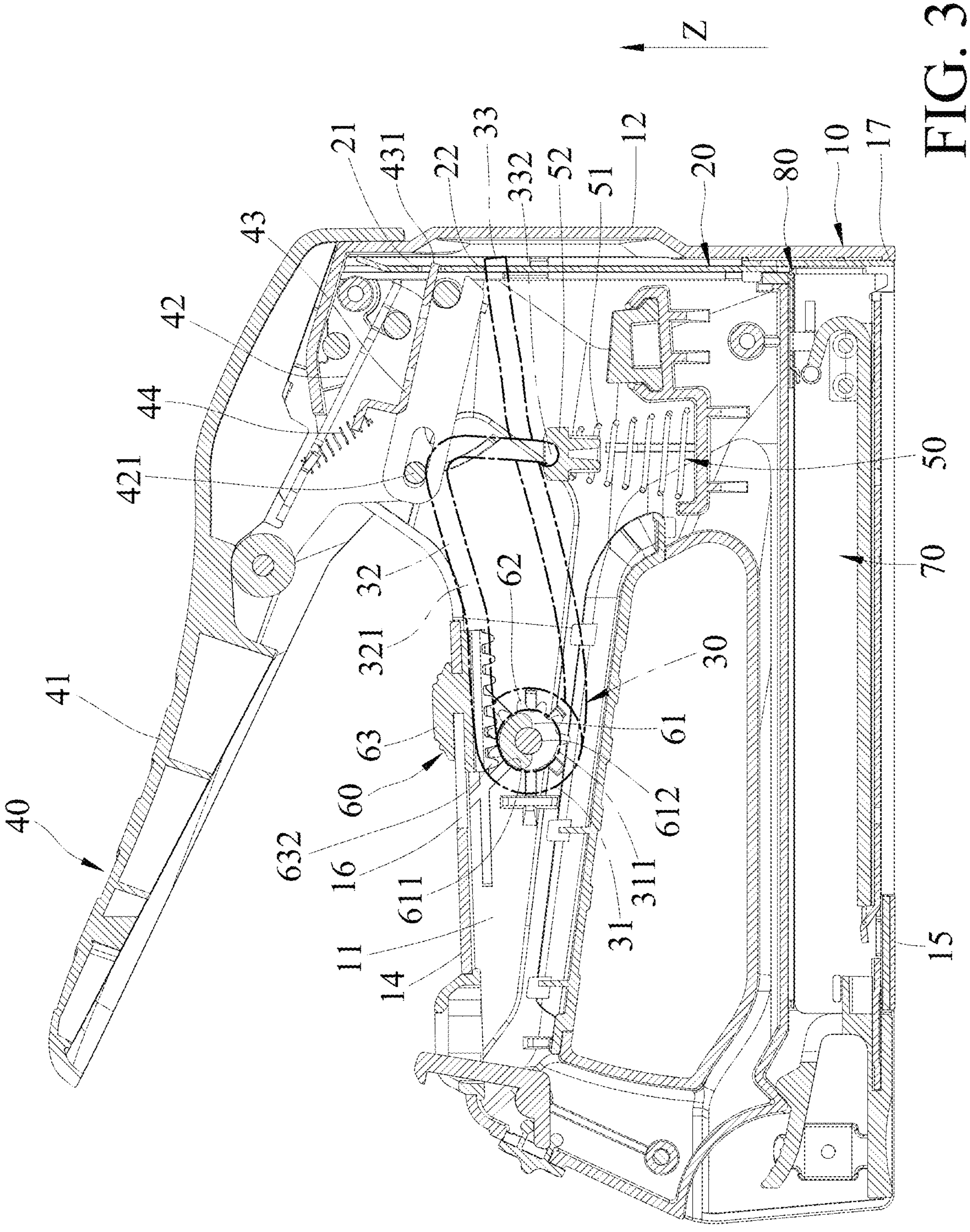
FIG. 3 is a schematic sectional view of the first embodiment.

Referring to FIGS. 1 and 3, the staple storage unit 70 is filled with a predetermined type of staples 80. The handle member 41 of the handle unit 40 is at an initial position, the abutment portion 421 is at an original position, the main segment 321 of the force storage unit 30 resiliently abuts against the abutment portion 421, the staple-strike piece 20 is at an un-striking position, and a bottom end of the staple-strike piece 20 is slightly higher than the staples 80 in the top-bottom direction (Z). The engagement portion 431 of the engagement member 43 engages the engagement groove 21 of the staple-strike piece 20, and the resilient unit 50 abuts against the connection segment 322 of the force storage unit 30.

Figure 6B:
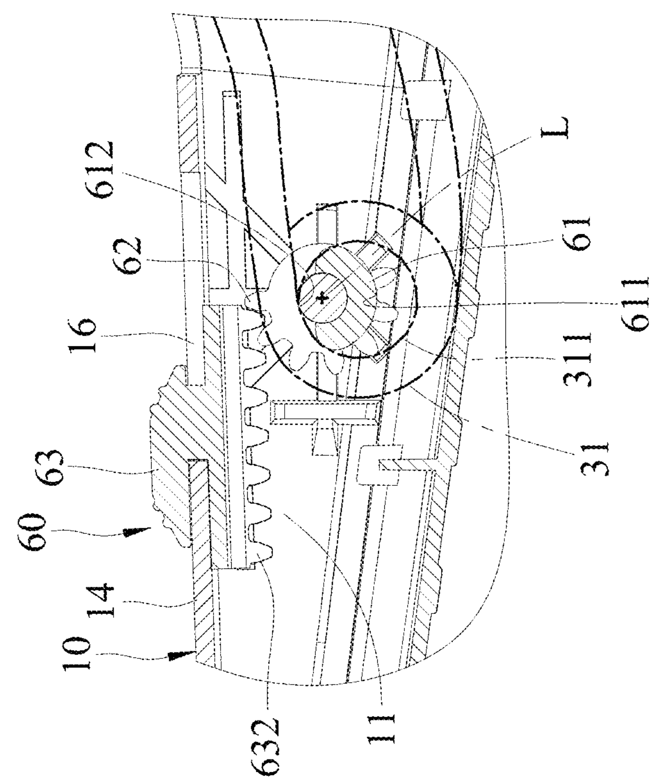
FIGS. 6A and 6B illustrate an operation process of the force adjustment unit.
Figure 6A:
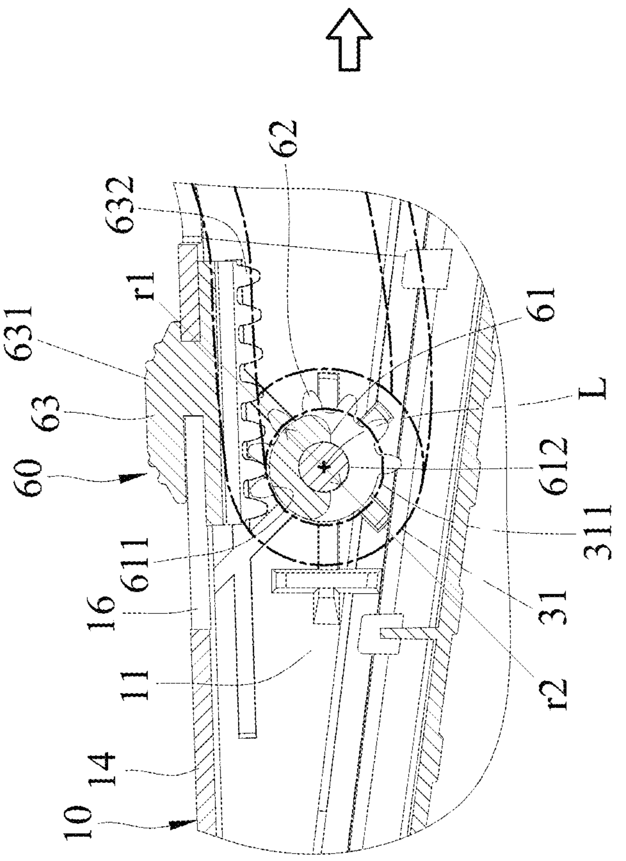

Referring to FIGS. 3 and 6A, the operation member 63 is located at a front portion of the slide groove 16, and the first support surface 611 with the greater radius faces upward, and abuts against a top side of the annular portion 31; at this time, since a distance between the annular portion 31 and the top portion 14 is small, a range of movement of the force storage unit 30 is great.

Figure 4:
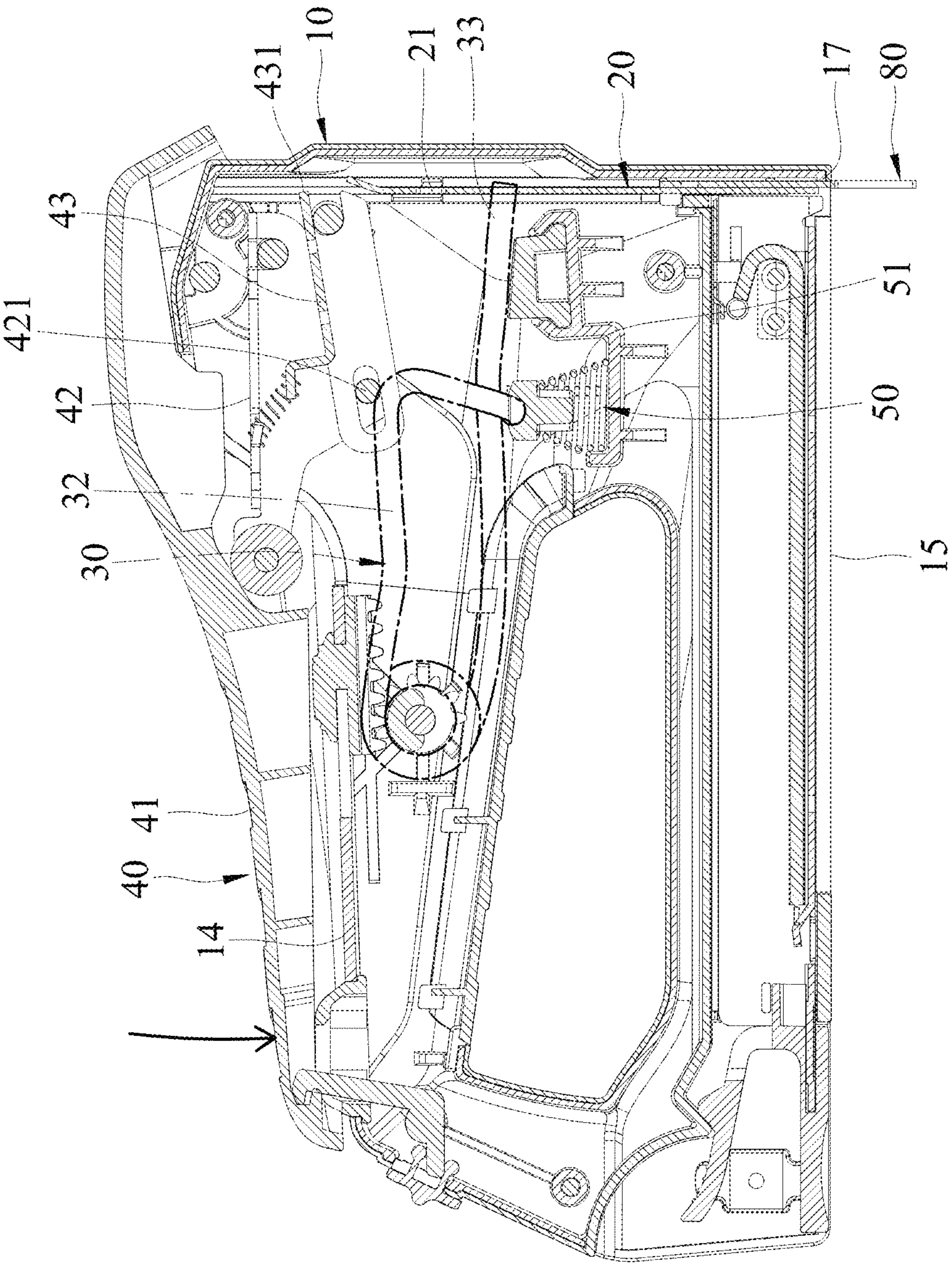
FIG. 4 is a schematic sectional view illustrating a handle unit of the first embodiment being operated.

Referring to FIGS. 3 and 4, an operation process of the force-adjustable staple gun is provided. When the handle member 41 of the handle unit is operated (e.g., is pressed downward, as shown by the arrow in FIG. 4), the handle member 41 urges the support frame 42 to pivot relative to the case unit 10, and the abutment portion 421 of the support frame 42 abuts against and presses the main segment 321 of the lever arm 32, so that the connection segment 322 of the lever arm 32 is urged to move toward the bottom portion 15 of the case unit 10 and abuts against and presses the resilient member 51, and thus the resilient member 51 is compressed and accumulates a restoring force for resiliently biasing the force storage unit 30 toward the top portion 14 of the case unit 10. At the same time, the engagement portion 431 of the engagement member 43 is urged by the handle member 41 through the support frame 42 to move toward the top portion 14 and rearward, so that the staple-strike piece 20 is urged thereby to drive the driver arm 33 of the force storage unit 30 to move toward the top portion 14, and thus the force storage unit 30 accumulates a restoring force for resiliently biasing the staple-strike piece 20 toward the staple outlet 17.

Referring to FIG. 4, when the handle member 41 is pivoted to an operation position, the engagement portion 431 of the engagement member 43 is detached from the engagement groove 21 of the staple-strike piece 20, and the driver arm 33 of the force storage unit 30 resiliently biases the staple-strike piece toward the staple outlet 17 by the restoring force, so that the staple 80 located at the staple outlet 17 is struck out.

When the handle member 41 pivots from the operation position to the initial position (i.e., is released, see FIGS. 4 to 3), the resilient member 51 resiliently biases the abutment seat 52 and the force storage unit 30 toward the top portion 14 through the restoring force, so that the support frame 42, the engagement member 43 and the handle member 41 are urged to pivot, and that the driver arm 33 is biased by the lever arm 32 to urge the staple-strike piece 20 toward the top portion 14 until the engagement portion 431 of the engagement member 43 is inserted into the engagement groove 21 of the staple-strike piece 20.

Figure 5:
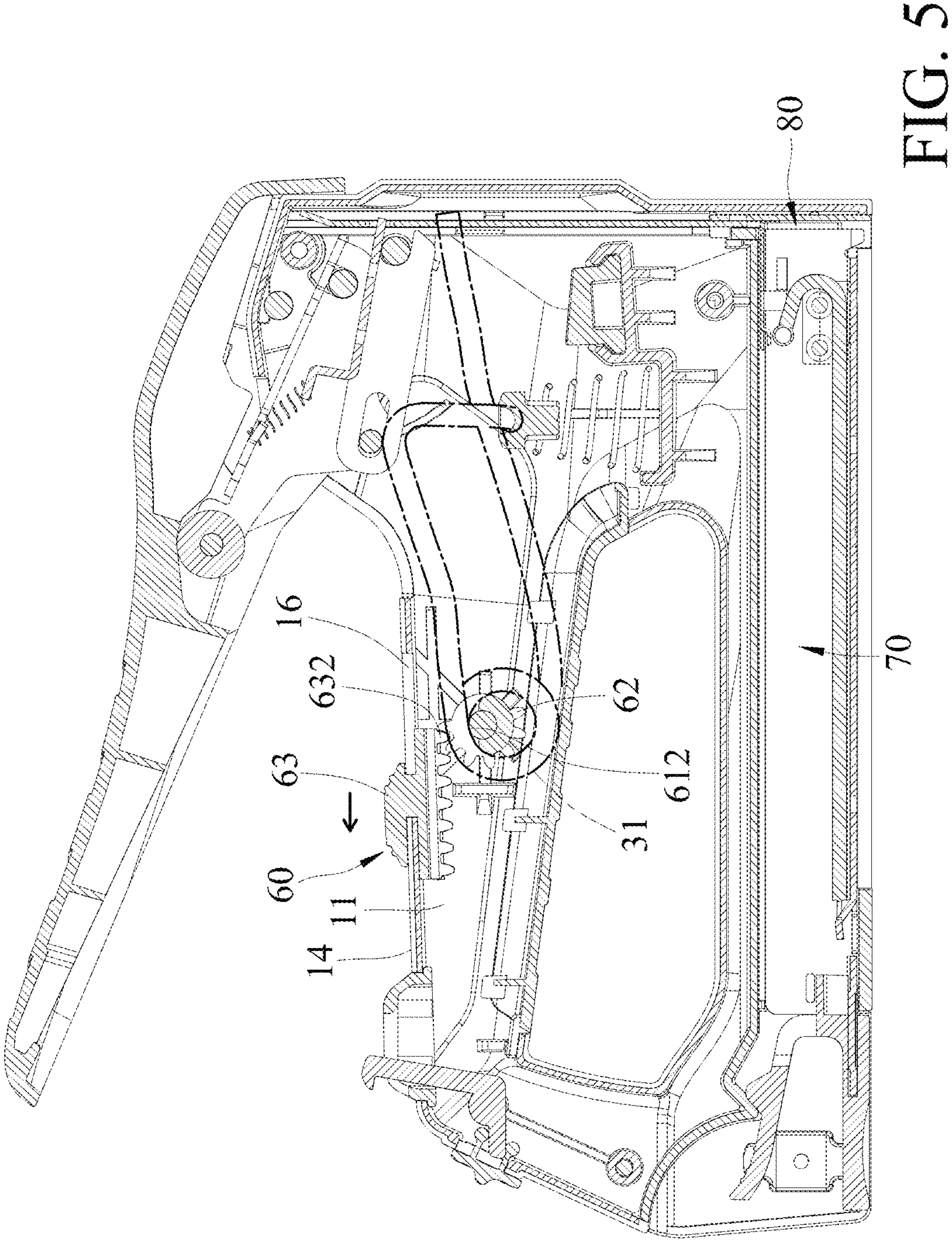
FIG. 5 is a schematic sectional view illustrating a force adjustment unit of the first embodiment being operated.

Referring to FIGS. 5 and 6B, since the staple storage unit 70 may store different types of the staples 80 (see FIG. 2), different striking depth and striking strength are required according to the staples 80 used. The user may operate the force adjustment unit 60 to meet such requirements. Specifically, the operation member 63 of the force adjustment unit 60 is slid in the slide grove 16 to a rear side of the slide grove 16 through operation of the operation portion 631. By virtue of the gear rack 632 meshing the gear wheel 62 and the gear wheel 62 being connected to the driver axle 61, when the operation member 63 is slid, the driver axle 61 and the gear wheel 62 are urged thereby to pivot, so that the second support surface 612 with the smaller radius faces upward, and abuts against the top side of the annular portion 31; at this time, since the distance between the annular portion 31 and the top portion 14 is greater, the range of movement of the force storage unit 30 is smaller.

Accordingly, through operation of the force adjustment unit 60 mentioned above, a height of the annular portion 31 in the top-bottom direction (Z) is adjusted (i.e., the distance between the annular portion 31 and the top portion 14 is adjusted), and relative positions of the lever arm 32 and the driver arm 33 of the force storage unit 30 are adjusted, so that the range of movement of the force storage unit 30 is adjusted, and thus the staple-strike piece 20 may provide different striking depth and striking strength.

Through operation of the handle unit 40, the force storage unit 30 accumulates the restoring force for resiliently biasing the staple-strike piece 20 toward the staple outlet 17. Specifically, the engagement portion 431 of the engagement member 43 is urged by the handle member 41 through the support frame 42 to move toward the top portion 14 and rearward, so that the staple-strike piece 20 is urged thereby to drive the driver arm 33 of the force storage unit 30 to move toward the top portion 14, and thus the force storage unit 30 accumulates the restoring force for resiliently biasing the staple-strike piece 20 toward the staple outlet 17.

Figure 7:
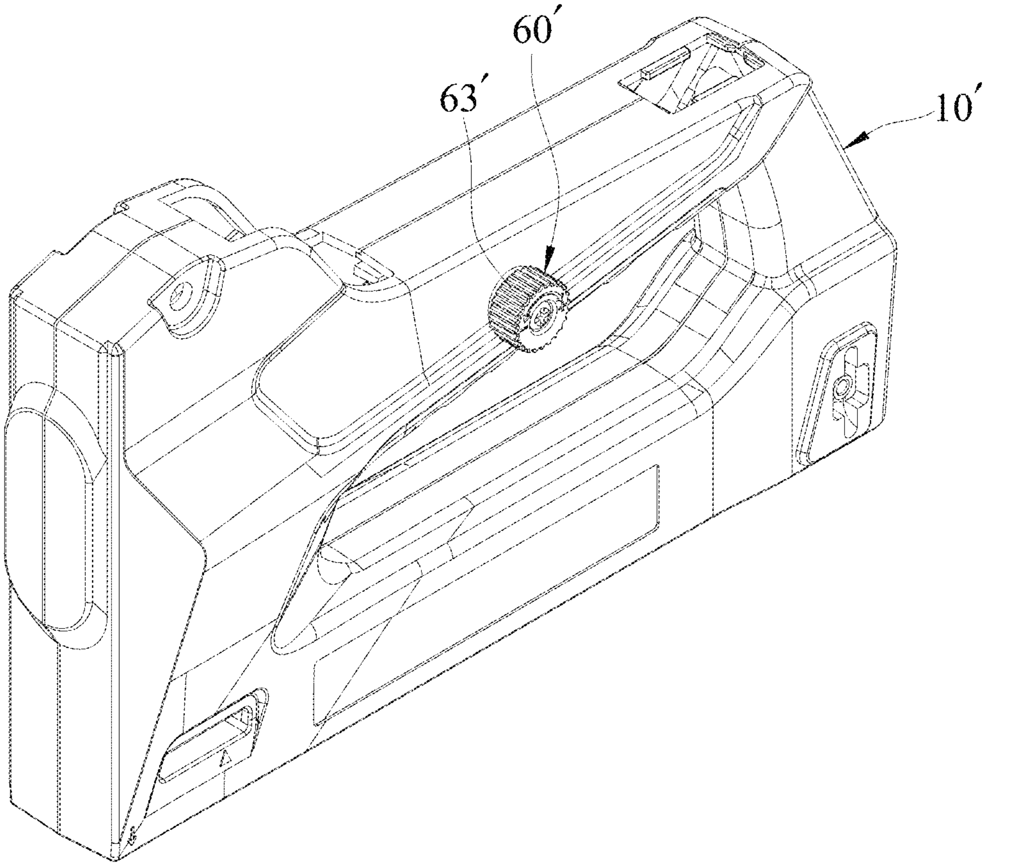
FIG. 7 is a fragmentary perspective view of a second embodiment of the force-adjustable staple gun according to the disclosure.
Figure 8:
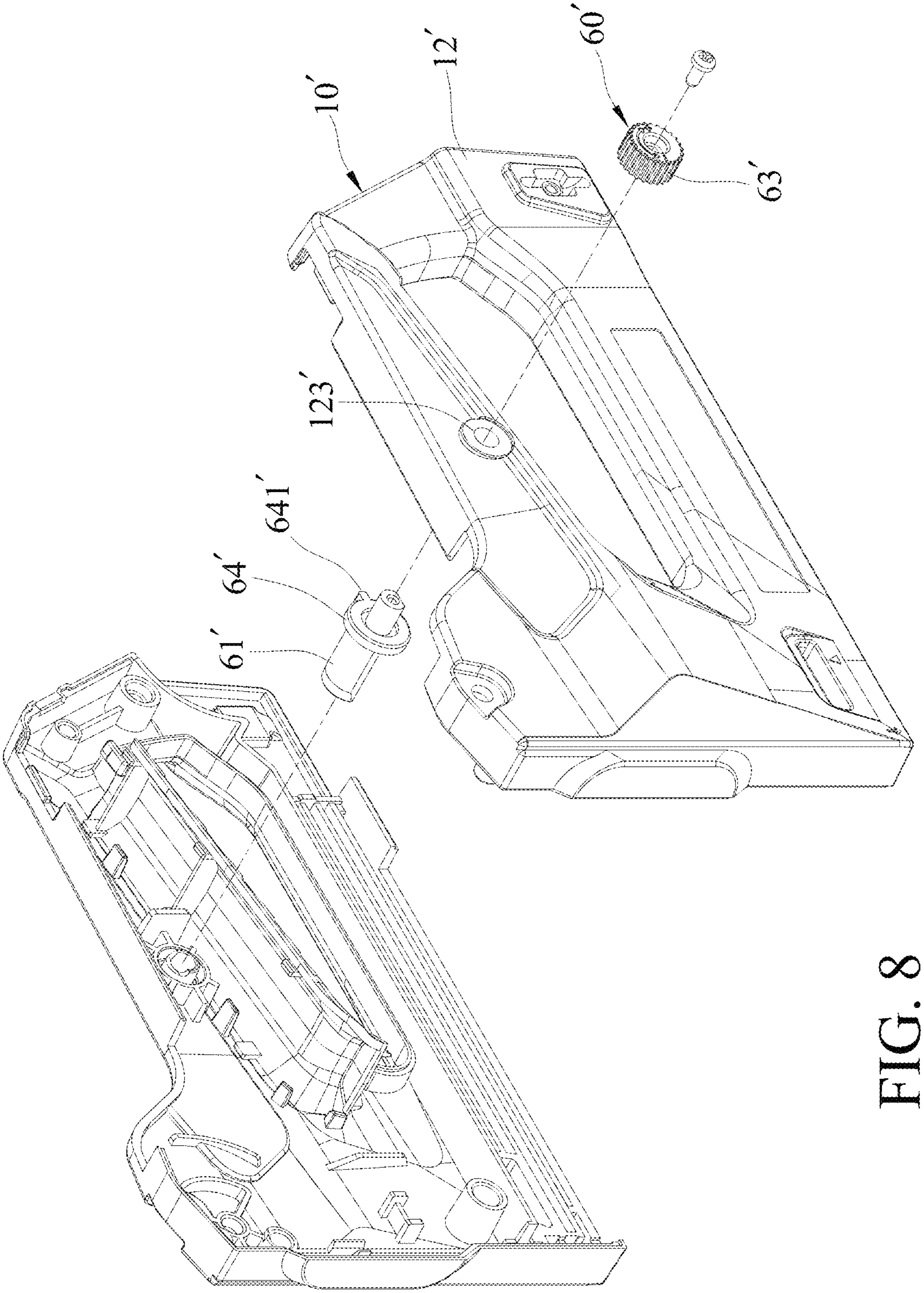
FIG. 8 is a fragmentary exploded perspective view of the second embodiment.
Figure 9:
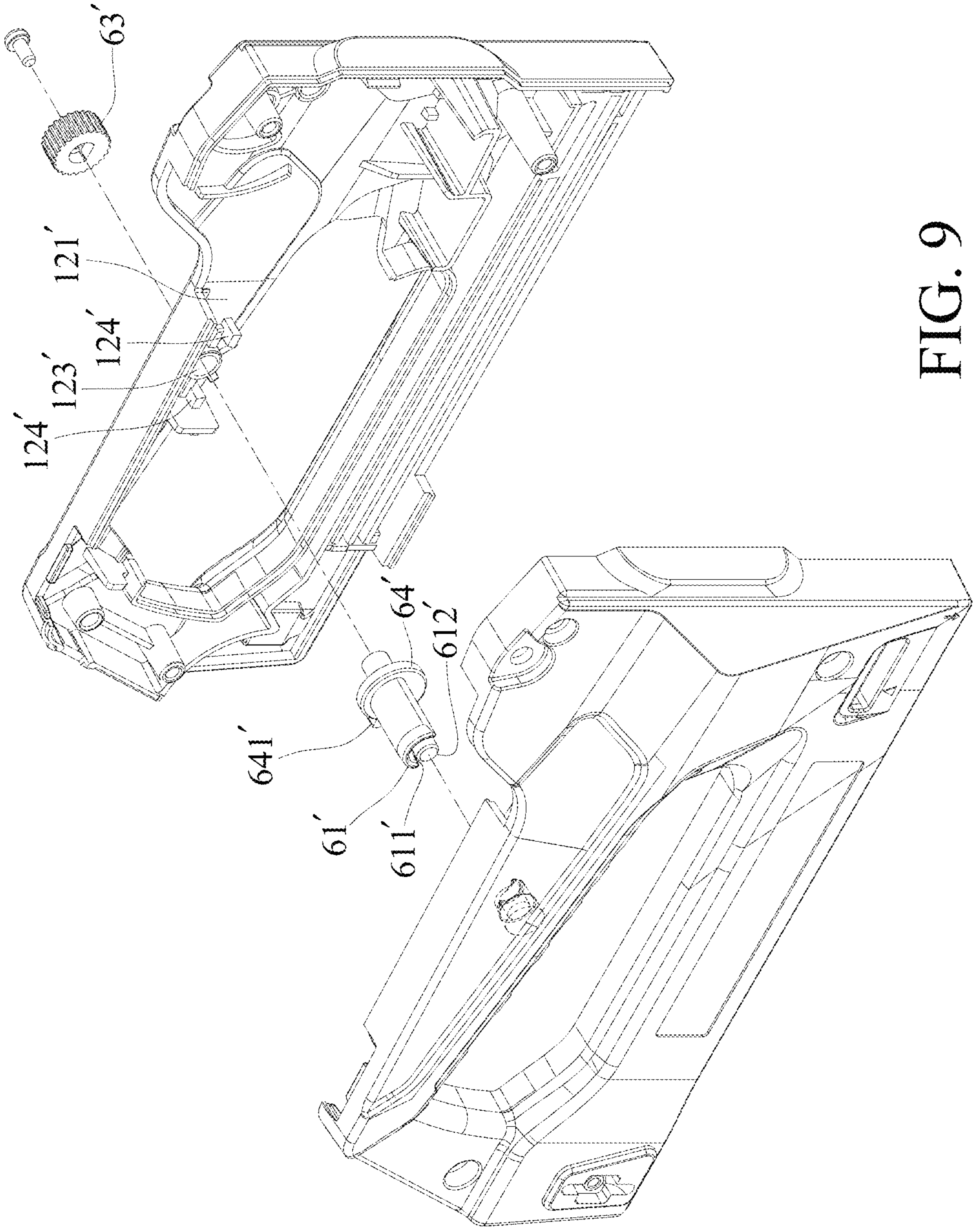
FIG. 9 is another fragmentary exploded perspective view of the second embodiment.

Referring to FIGS. 7 to 9, a second embodiment of the force-adjustable staple gun according to the disclosure is provided, and differences between the first and second embodiments lie in the structures and shapes of the case unit and the force adjustment unit and are illustrated in the following.

The first case body 12' of the case unit 10' further has two limitation blocks 124' that protrude from the first inner surface 121' and that are respectively located on two sides of the axle hole 123'. The axle hole 123' of the second embodiment extends through the first inner surface 121 and the first outer surface 122. The operation member 63' is pivotably mounted to the axle hole 123' and is connected to the driver axle 61'. The driver axle 61' pivotably extends through the axle hole 123' to be connected to the operation member 63'.

The force adjustment unit 60' further includes a rotary plate 64' that is connected to the operation member 63' and the driver axle 61' and that has a protrusion block 641'. The limitation blocks 124' are operable to limit pivoting of the rotary plate 64' through the protrusion block 641'. The driver axle 61' and the rotary plate 64' are integrally formed in one-piece, and the operation member 63' is in a form of a knob.

Specifically, when the operation member 63' of the force adjustment unit 60' is operated (e.g., is pivoted), the driver axle 61' and the rotary plate 64' are urged thereby to pivot, so that orientation of the first support surface 611' and the second support surface 612' is adjusted in a similar manner to the first embodiment; in addition, by virtue of the abutment of each of the limitation blocks 124' and the protrusion block 641', pivoting of the rotary plate 64' is limited and positions of the first support surface 611' and the second support surface 612' are oriented. Accordingly, through operation of the force adjustment unit 60' of the second embodiment, the height of the annular portion 31 in the top-bottom direction (Z) can be adjusted as well (i.e., the distance between the annular portion 31 and the top portion 14 can be adjusted), and relative positions of the lever arm 32 and the driver arm 33 of the force storage unit 30 are adjusted, so that the range of movement of the force storage unit 30 is adjusted, and thus the staple-strike piece may provide different striking depth and striking strength.

Thus, the force adjustment unit 60, 60' of the disclosure may be used with different types of the staples 80 and meet different requirements (e.g., striking depth and striking strength), and are easy to operate.

To sum up, the force-adjustable staple gun of the disclosure has a simple structure, and is easy to assemble, which achieves the object of the disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A force-adjustable staple gun, comprising:

a case unit having an accommodation space therein;

a staple-strike piece disposed in said accommodation space and movable in a top-bottom direction;

a handle unit pivotably mounted to said case unit;

a force storage unit disposed in said accommodation space, operable to resiliently bias said staple-strike piece to move in the top-bottom direction, and having an annular portion that defines an inner hole, a lever arm that is connected to one end of said annular portion, and a driver arm that is connected to another end of said annular portion, said lever arm being operable to be urged by said handle unit for said driver arm to resiliently move;

a resilient unit disposed in said accommodation space and operable to resiliently bias said handle unit; and a force adjustment unit mounted to said case unit, and including a driver axle that is pivotably mounted to said case unit and that extends through said inner hole, and an operation member that is operable to urge said driver axle to pivot relative to said case unit, said driver axle extending along a central line, and having a first support surface that is disposed around the central line, and a second support surface that is disposed around the central line and that is located on a side of said first support surface, a first distance between said first support surface and the central line being greater than a second distance between said second support surface and the central line.

2. The force-adjustable staple gun as claimed in claim 1, wherein said first support surface of said force adjustment unit is semi-circular, and said second support surface of said force adjustment unit is semi-circular.

3. The force-adjustable staple gun as claimed in claim 2, wherein said force adjustment unit further includes a gear wheel that is connected to said driver axle, said operation member being slidably mounted to said case unit, and having an operation portion that protrudes and is located outside said case unit, and a gear rack that is disposed in said accommodation space of said case unit and that meshes with said gear wheel.

4. The force-adjustable staple gun as claimed in claim 3, wherein said case unit further has:

a first case body and a second case body that cooperatively define said accommodation space and that have a top portion and a bottom portion opposite to said top portion; and a slide groove that is formed in said top portion and that spatially communicates with said accommodation space and an external environment, wherein said first case body has a first inner surface that is adjacent to said accommodation space, a first outer surface that is opposite to said first inner surface, and an axle hole that is recessed from said first inner surface toward said first outer surface; and wherein said second case body has a second inner surface that is adjacent to said accommodation space, a second outer surface that is opposite to said second inner surface, and a bearing hole that is recessed from said second inner surface toward said second outer surface, said operation member of said force adjustment unit being slidably mounted to said slide groove.

5. The force-adjustable staple gun as claimed in claim 2, wherein said case unit further has:

a first case body and a second case body that cooperatively define said accommodation space and that have a top portion and a bottom portion opposite to said top portion, wherein said first case body has a first inner surface that is adjacent to said accommodation space, a first outer surface that is opposite to said first inner surface, and an axle hole that extends through said first inner surface and said first outer surface; and wherein said second case body has a second inner surface that is adjacent to said accommodation space, a second outer surface that is opposite to said second inner surface, and a bearing hole that is recessed from said second inner surface toward said second outer surface, said operation member being pivotably mounted to said axle hole.

6. The force-adjustable staple gun as claimed in claim 5, wherein:

said first case body of said case unit further has two limitation blocks that protrude from said first inner surface and that are respectively located on two sides of said axle hole; and said force adjustment unit further includes a rotary plate that is connected to said operation member and that has a protrusion block, said two limitation blocks being operable to limit pivoting of said rotary plate through said protrusion block.

7. The force-adjustable staple gun as claimed in claim 1, wherein said case unit further has:

a first case body and a second case body that cooperatively define said accommodation space and that have a top portion and a bottom portion opposite to said top portion, wherein said first case body has a first inner surface that is adjacent to said accommodation space, a first outer surface that is opposite to said first inner surface, and an axle hole that extends through said first inner surface and said first outer surface; and wherein said second case body has a second inner surface that is adjacent to said accommodation space, a second outer surface that is opposite to said second inner surface, and a bearing hole that is recessed from said second inner surface toward said second outer surface, said operation member being pivotably mounted to said axle hole.

8. The force-adjustable staple gun as claimed in claim 7, wherein said first case body of said case unit further has two limitation blocks that protrude from said first inner surface and that are respectively located on two sides of said axle hole; and said force adjustment unit further includes a rotary plate that is connected to said operation member and that has a protrusion block, said two limitation blocks being operable to limit pivoting of said rotary plate through said protrusion block.

9. The force-adjustable staple gun as claimed in claim 1, wherein said case unit further has:

a first case body and a second case body that cooperatively define said accommodation space and that have a top portion and a bottom portion opposite to said top portion; and a slide groove that is formed in said top portion and that spatially communicates with said accommodation space and an external environment, wherein said first case body has a first inner surface that is adjacent to said accommodation space, a first outer surface that is opposite to said first inner surface, and an axle hole that is recessed from said first inner surface to said first outer surface; and wherein said second case body has a second inner surface that is adjacent to said accommodation space, a second outer surface that is opposite to said second inner surface, and a bearing hole that is recessed from said second inner surface toward said second outer surface, said operation member of said force adjustment unit being slidably mounted to said slide groove.

10. The force-adjustable staple gun as claimed in claim 1, wherein said force adjustment unit further includes a gear wheel that is connected to said driver axle, said operation member being slidably mounted to said case unit, and having an operation portion that protrudes and is located outside said case unit, and a gear rack that is disposed in said accommodation space of said case unit and that engages said gear wheel.

11. The force-adjustable staple gun as claimed in claim 10, wherein said case unit further has:

a first case body and a second case body that cooperatively define said accommodation space and that have a top portion and a bottom portion opposite to said top portion; and a slide groove that is formed in said top portion and that spatially communicates with said accommodation space and an external environment, wherein said first case body has a first inner surface that is adjacent to said accommodation space, a first outer surface that is opposite to said first inner surface, and an axle hole that is recessed from said first inner surface toward said first outer surface; and wherein said second case body has a second inner surface that is adjacent to said accommodation space, a second outer surface that is opposite to said second inner surface, and a bearing hole that is recessed from said second inner surface toward said second outer surface, said operation member of said force adjustment unit being slidably mounted to said slide groove.

* * * * *